Patented Oct. 11, 1927.

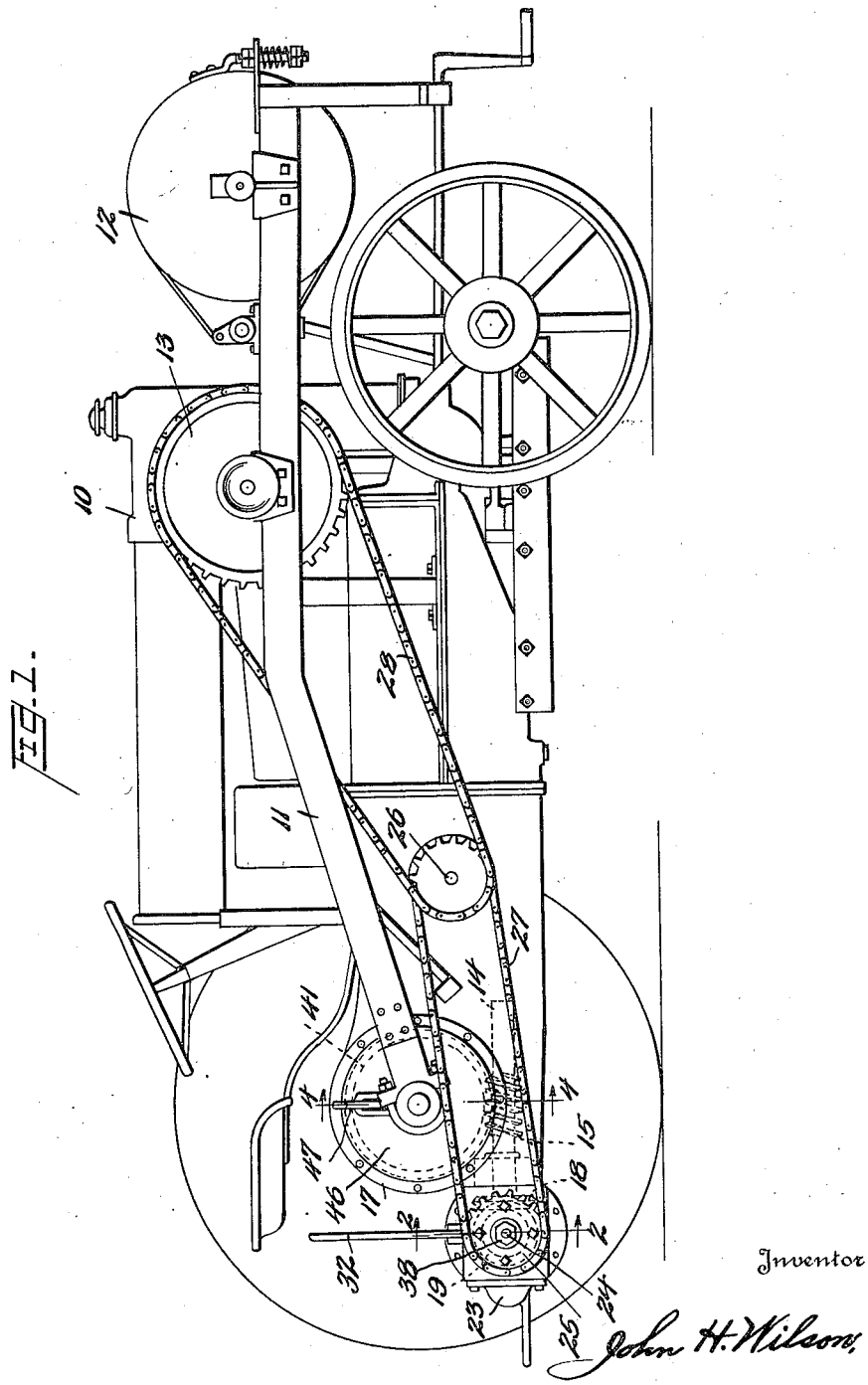

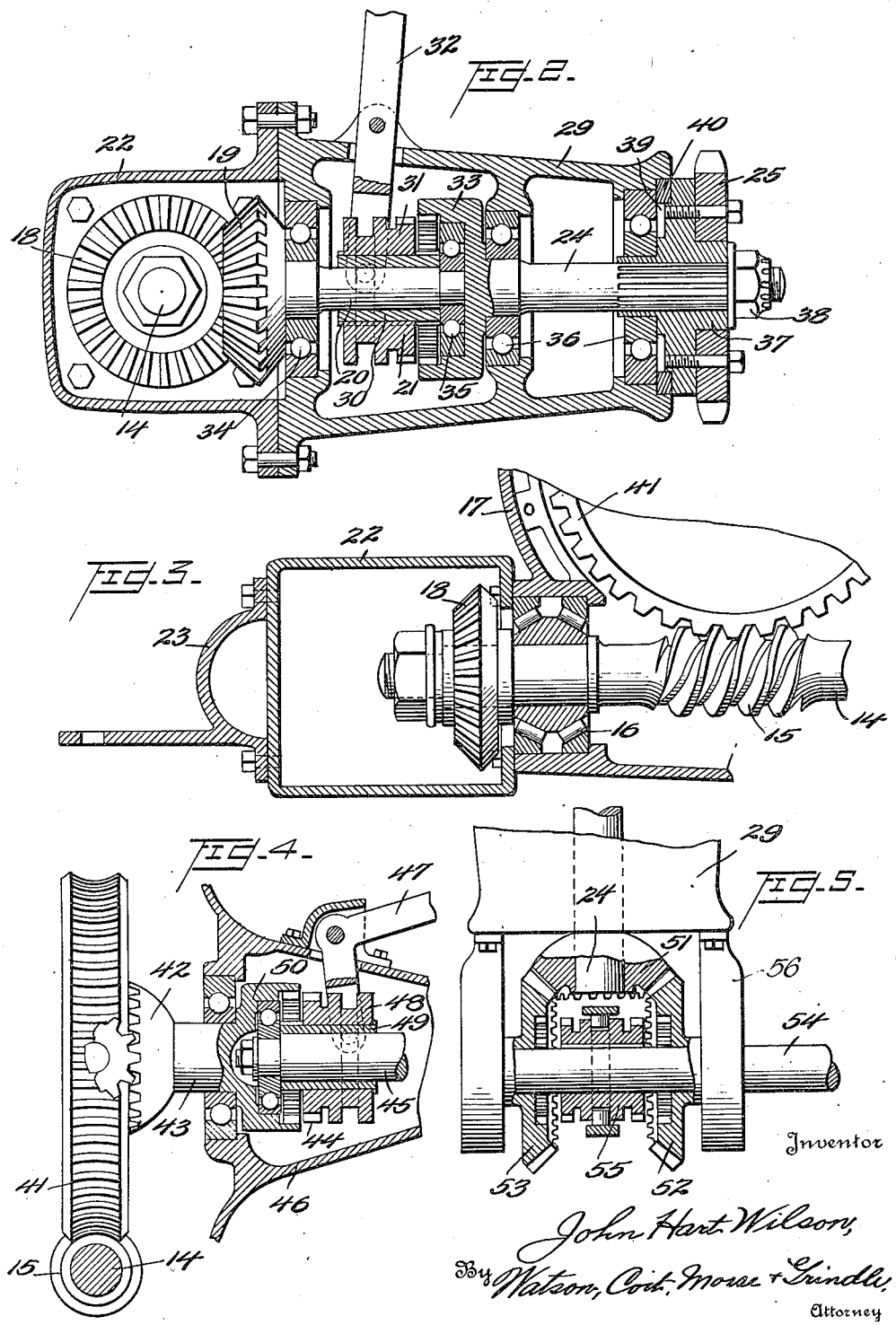

1,644,765

UNITED STATES PATENT OFFICE.

JOHN HART WILSON, OF BURKBURNETT, TEXAS.

POWER TAKE-OFF FOR TRACTORS.

Application filed February 9, 1925. Serial No. 8,016.

This invention relates to tractors, and more particularly to a power take-off for tractors by means of which the prime mover of the tractor may be utilized to drive auxiliary apparatus, such as a winch, pump, sawmill or the like.

The invention is illustrated in connection with a Fordson tractor of well-known type and a winch such as is described in applicant's Patent #1,499,045, June 24, 1924. It is to be understood, however, that the invention is not thus limited in its scope, but may be applied to any type of tractor and used to drive any sort of auxiliary apparatus.
It is an object of this invention to provide a power take-off by means of which the prime mover of the tractor may be used to drive either the tractor or the winch or both.

It is a further object of this invention to provide a power take-off for a tractor which is connected directly to the main drive or propeller shaft of the tractor.

Other objects and advantages of my invention will be apparent from the following description, taken in conjunction with the accompanying drawings, which form a part of this specification, and in which:

Figure 1 is a side elevation of a Fordson tractor showing my power take-off and winch applied thereto, the right rear wheel of the tractor being removed to more clearly show the invention;

Figure 2 is a sectional view taken on the line 2—2 of Figure 1 and showing the power take-off shaft;

Figure 3 is a longitudinal central section through the differential of the tractor showing the worm and worm drive shaft and the manner of connecting my power take-off thereto;

Figure 4 is a detail section on the line 4—4 of Figure 1; and

Figure 5 is a sectional view of a reverse gear which may be utilized in connection with my invention.

Referring more particularly to the drawings, in which like reference characters denote like parts throughout the several views thereof, 10 denotes generally a well-known Fordson tractor having an auxiliary frame 11 secured thereto on which is mounted a winch 12 and a winch driving sprocket 13.

The adaptation of my invention to a Fordson tractor may be readily made by removing the worm drive shaft or propeller shaft regularly supplied with the tractor, and substituting a longer worm drive shaft 14 having the portion extending rearwardly from the worm 15 increased in length. The rear end of the shaft 14 will project beyond the roller bearing 16 mounted in the rear of the differential housing 17, as is clearly shown in Figure 3. A bevel gear 18 is keyed on the projecting end of the propeller shaft 14 and is held in place by a suitable lock nut and washers.

As shown in Figure 2, a second bevel gear 19, secured to a shaft 20 connected to the driving member of a clutch 21, meshes with the gear 18. A suitable housing 22 encloses the bevel gears 18 and 19, and may be bolted to the rear of the differential housing 17 at the same place usually occupied by the draw bar cap 23, which according to my invention may be bolted to the rear wall of housing 22, as shown in Figure 3.

The driven member of the clutch 21 is secured to the power take-off shaft 24 which is arranged in axial alignment with the shaft 20. A sprocket 25 is provided on the end of the power take-off shaft 24. The sprocket 25 may be connected by a suitable drive to the auxiliary apparatus. As shown in Figure 1, a jack shaft 26 is mounted on the side of the tractor, preferably in the place provided on a Fordson tractor for the usual belt pulley attachment. A chain 27 connects the sprocket 25 with a sprocket on the jack shaft 26 and a second chain 28 connects another sprocket fast on the same jack shaft 26 to the winch driving sprocket 13, which is secured to a suitable countershaft, as described in my patent above referred to. The winch itself forms no part of my present invention, and description of the same is therefore omitted. It is of course evident that a single drive chain might be utilized and the jack shaft 26 eliminated, in which case an idler sprocket would be employed to keep the drive chain clear of the rear axle housing. Belts might be substituted for the chains if desired.

A conical housing 29 is bolted to a circular flange on the side of the casing 22, and serves to protect the clutch 21 and the shafts 20 and 24, as well as providing a support for the shafts.

The clutch mechanism may be of any suitable or desired type. In the embodiment disclosed, the clutch 21 comprises a sleeve 30 splined internally and externally and pressed onto the splined shaft 20. A splined sliding clutch member 31, operated by a yoke on the clutch lever 32, is provided with external teeth adapted to mesh with internal teeth on the driven member 33 of the clutch. A ball bearing 34 carried by the casing 29 supports the inner end of shaft 20, and the outer end of the shaft is carried in a bearing 35 held within the cup-shaped driven member 33. The power take-off shaft 24 is mounted at each end in bearings 36 supported by the housing 29. The sprocket 25 is preferably bolted to a splined hub 37 fastened upon the splined outer end of shaft 24 and the whole assembly secured in place by a lock nut 38. A felt washer 39 and a retaining washer 40 are also provided at the outer end of housing 29.

In Figure 4 is shown the mechanism for disconnecting the propeller shaft from one of the rear wheels when it is desired to operate only the winch or other auxiliary mechanism. The worm 15 on the propeller shaft 14 meshes with the worm wheel 41, which in turn operates, through the usual differential gearing, the differential gear 42. The shaft 43 of this differential gear is connected to the driving member of a clutch 44, the driven member of the clutch being connected to the axle shaft 45. The clutch 44 is mounted within the axle housing 46 and is operated by lever 47 connected to a sliding member 48 mounted on the splined sleeve 49 secured to shaft 45. Sliding member 48 is provided with external teeth meshing with internal teeth on the driven member 50 of the clutch, which is secured to shaft 43. Suitable bearings are provided for the support of the shafts 43 and 45 and the general construction of the clutch may be substantially similar to that of the clutch 21.

When the tractor is moving and it is not desired to operate the auxiliary apparatus, the clutch 21 will be disconnected by means of the lever 32. The gear 19 meshing with the gear 18 on the propeller shaft will then run idly. If it is desired to operate the winch while the tractor is moving, the clutch 21 will be engaged, causing the sprocket wheel 25 to revolve and drive the winch. To operate the power take-off mechanism without operating the tractor itself, it is only necessary to have the clutch 21 engaged and the clutch 44 disengaged. When the clutch 44 is disengaged, the differential gear 42 and shaft 43 will turn idly as the worm wheel 41 is revolved by the worm 15. A corresponding differential gear on the other side of the differential (not shown) will, of course, still remain connected to its driving wheel, but since there is a load on this shaft and none on the shaft 43, the former will remain motionless and the shaft 43 revolve, in accordance with the well-known principles of differential construction.

Figure 5 illustrates a reverse gear which may be used in connection with my power take-off device. For this purpose the outer end of the power take-off shaft 24 is provided with a bevel gear 51 meshing with two bevel gears 52 and 53 on opposite sides of the bevel gear 51 and both mounted loosely on a shaft 54. By means of a double clutch mechanism 55, the details of which will not be described as this clutch is substantially similar to clutches 21 and 44, either the gear 52 or the gear 53 may be connected to the shaft 54. By this means the shaft 54 may be rotated in either direction as desired. The shaft 54 is mounted in suitable hangers 56 bolted to the outer end of casing 29. Where this reversing mechanism is employed, the sprocket 25 and its corresponding chains may be eliminated, and the shaft 54 run up the side of the tractor and directly connected by suitable gearing to the auxiliary apparatus. In such case the shaft 54 would, of course, be supported at points intermediate its ends in suitable hangers secured to the frame 11.

When the sprocket 25 is utilized the regular three speeds forward and one reverse of the Fordson tractor transmission may be obtained at the power take-off shaft. The use of the reversing gear shown in Figure 5 permits three speeds forward and three reverse to be obtained. While the power take-off mechanism described is primarily intended for use with my winch above referred to, it may obviously be used with equal success for driving any kind of machinery.

Many minor changes or alterations might be made in the device above described without affecting the spirit of my invention and such modifications are within the intent of the appended claims.

Having thus described the invention, what is claimed as new and desired to be secured by United States Letters Patent is:

1. In combination with a tractor, a transverse horizontal power take-off shaft mounted in rear of and below the differential thereof, a sprocket on the end of said power take-off shaft adapted to receive a chain for driving mechanism mounted on the front end of the frame of said tractor, a bevel gear housing bolted to the casing of said differential, and having a lateral extension providing bearings for said power take-off shaft, the worm drive shaft of said tractor extending rearwardly of said differential casing and projecting into said bevel gear housing, a bevel gear on the end of said worm drive shaft within said housing, a bevel gear meshing therewith, a clutch having its driving member connected to said driven bevel gear and its driven member connected to said power take-off shaft, said bevel gear casing being provided with a slot, and an operating lever extending upwardly from said clutch through said slot in reach of the operator of said tractor when mounted on the driver's seat.

2. The structure set forth in claim 1 in combination with a clutch mounted within one of said axle housings having its driving member connected to the tractor differential and its driven member connected to the axle of one of said driving wheels, whereby either the tractor or the power take-off shaft or both may be selectively operated.

In testimony whereof I hereunto affix my signature.

JOHN HART WILSON.